April 14, 1970  J. B. FOX ET AL  3,506,026
VALVES
Filed March 15, 1967  3 Sheets-Sheet 1
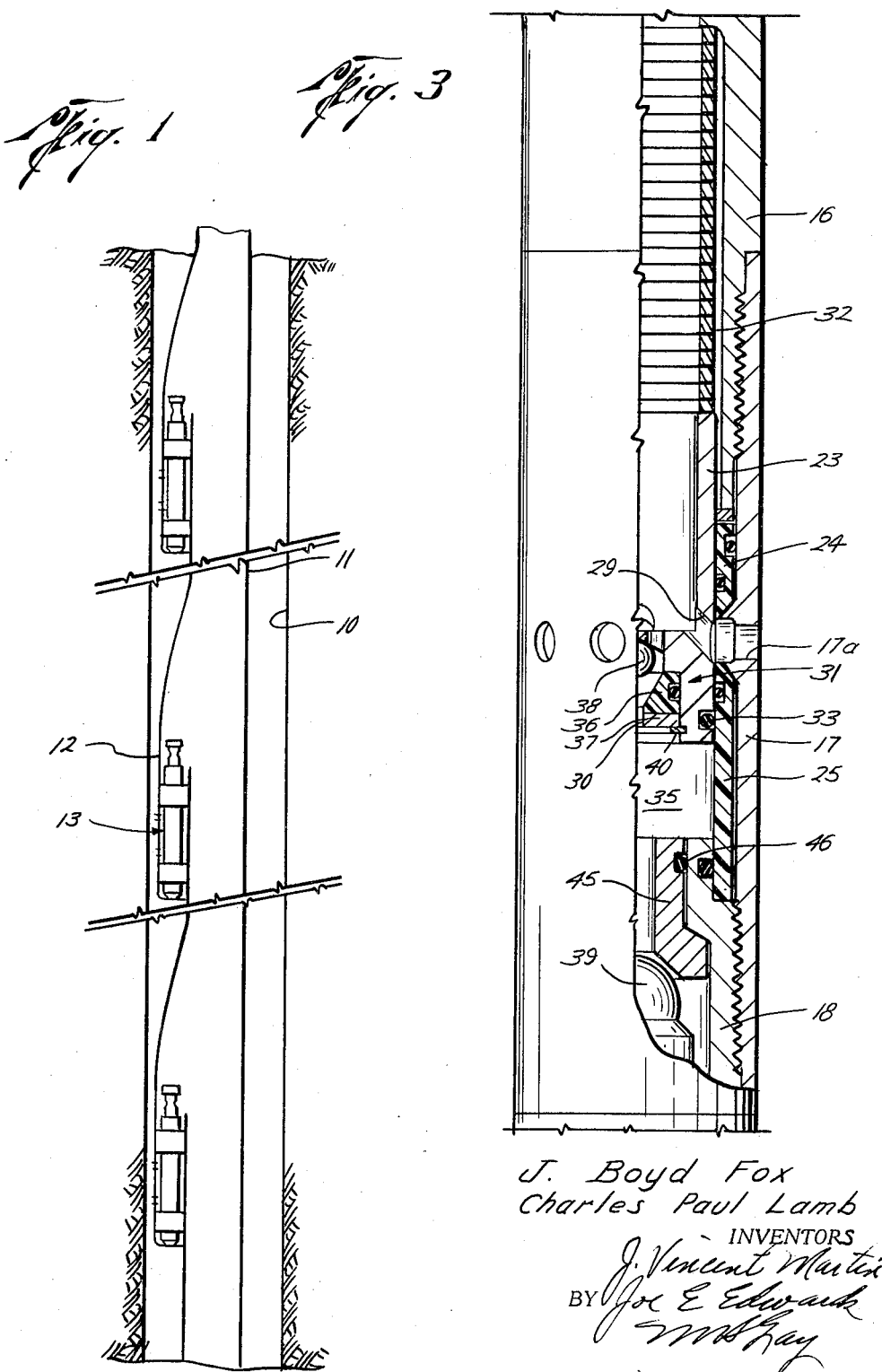
J. Boyd Fox
Charles Paul Lamb
INVENTORS
BY
ATTORNEYS April 14, 1970    J. B. FOX ET AL    3,506,026
VALVES
Filed March 15, 1967    3 Sheets-Sheet 2

J. Boyd Fox
Charles Paul Lamb
INVENTORS
BY
ATTORNEYS

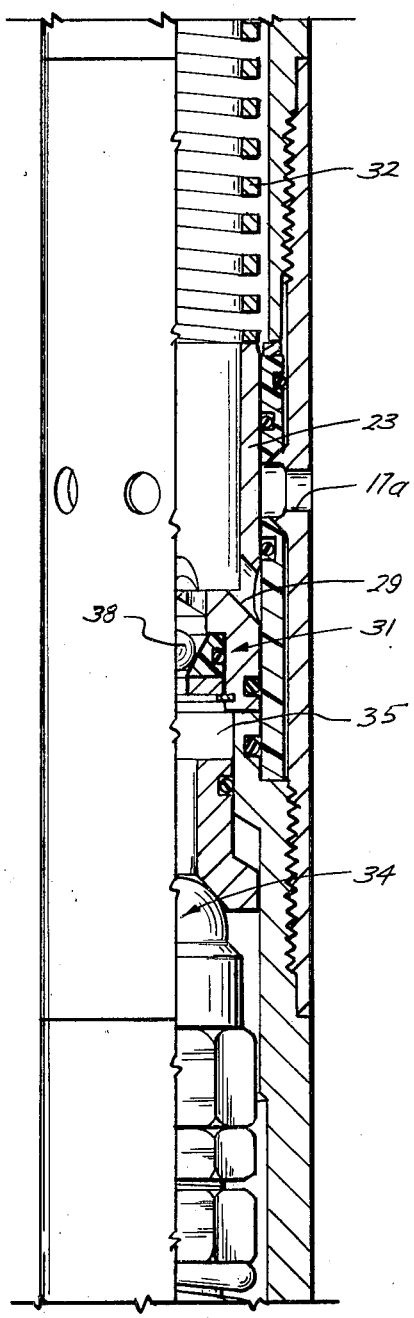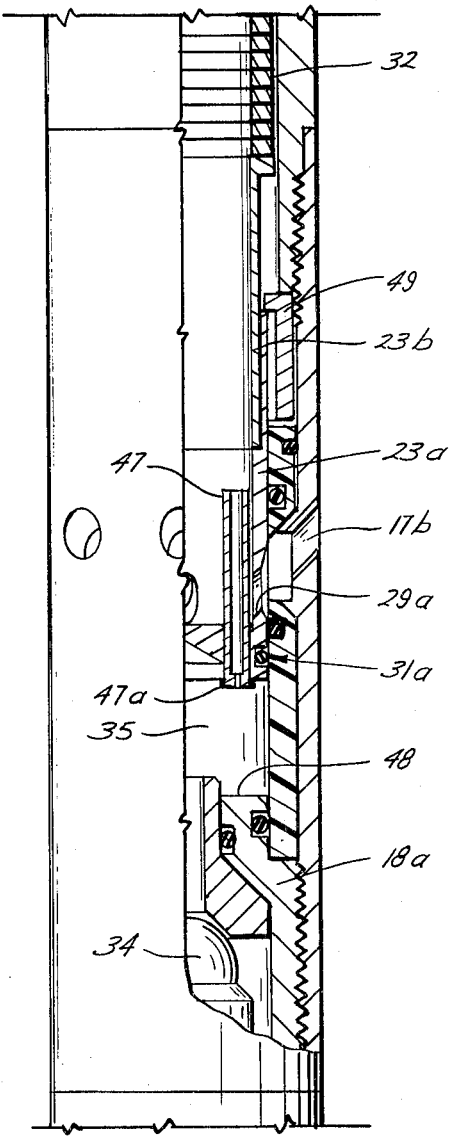

United States Patent Office 3,506,026
Patented Apr. 14, 1970

3,506,026
VALVES
J. Boyd Fox and Charles Paul Lamb, Garland, Tex., assignors to Merla Tool Corporation, Garland, Tex., a corporation of Texas
Filed Mar. 15, 1967, Ser. No. 623,450
Int. Cl. F04f 1/08
U.S. Cl. 137—155                                                    7 Claims

ABSTRACT OF THE DISCLOSURE

A gas lift valve of the pilot operated type wherein a main valve pressure responsive operator is subjected to outlet pressure on both sides when the pilot valve is closed and subjected to inlet pressure on one side and outlet pressure on the other side when the pilot valve is open. The main valve takes the form of a ported cylindrical sleeve cooperating with a ported cylindrical bore in the tubular valve casing.

---

This invention relates to valves. In one aspect it relates to a gas lift valve system in which gas flowing through the valve urges it toward its seat. In another aspect it relates to a valve which utilizes a sleeve valve member for the main valve member.

In pilot operated valves of the type which may be either attached to the exterior of a mandrel or landed in a side pocket or other receptacle in the mandrel, it has been customary to use a valve seat in the main flow passageway and a conventional valve member cooperating with this seat. Thus the valve member is positioned in the flow stream and provides an obstruction to flow. This type of valve has conventionally employed a back check valve in the main flow passageway to prevent backflow through the valve in the event of a reverse pressure condition. This back check valve also provides an obstruction to flow.

The conventional pilot operated gas lift valve opens with a differential of pressure across a piston. To absorb the energy of this differential, it has been customary to provide a bumper assembly to arrest movement of the valve member after it reaches open position. Closing movement of the valve has also been occasioned by differential of pressure. These rapid valve member movements decrease the life of the valve.

It has been conventional to mount valves within mandrels in a manner such that the reactive force of gas passing therethrough tends to unseat the valve. This has required a substantial latch member to latch the valve member in seated position.

It is an object of this invention to provide a gas lift valve having an exceptionally long life.

Another object is to provide a gas lift valve which when mounted within a mandrel is urged toward seated position by the reactive force of gas passing therethrough.

Another object is to provide a gas lift valve having a wide-open unobstructed flow passageway downstream of the ports through which casing gas enters the valve, and in which back flow due to reverse pressure conditions cannot occur.

Another object is to provide a gas lift valve in which a single spring acts as a shock absorber on opening of the valve member and in which the spring is the only means of closing the valve.

Another object is to provide a gas lift valve with back check provisions which are out of the flow stream during normal flow.

Another object is to provide a gas lift valve having a very low breakout friction on valve opening which is not subject to scale and dirt buildup.

Another object is to provide a gas lift valve which may have a low differential across the power section to effect opening of the valve.

Other objects, features and advantages of this invention will be apparent from the drawings, the specification and the claims.

In the drawings, wherein illustrative embodiments of this invention are shown, and wherein like reference numerals indicate like parts, FIGURE 1 is a fragmentary section of a well bore illustrating the mounting of the valves of this invention in a tubing in the well;

FIGURE 3 is a fragmentary view partially in elevation and partially in quarter-section illustrating the valve of FIGURES 2A and 2B in open position;

FIGURE 4 is a view similar to FIGURE 3 illustrating the valve under reverse flow conditions; and, FIGURE 5 is a fragmentary view illustrating a modified form of power section for the valve.

Figures 2A, 2B:
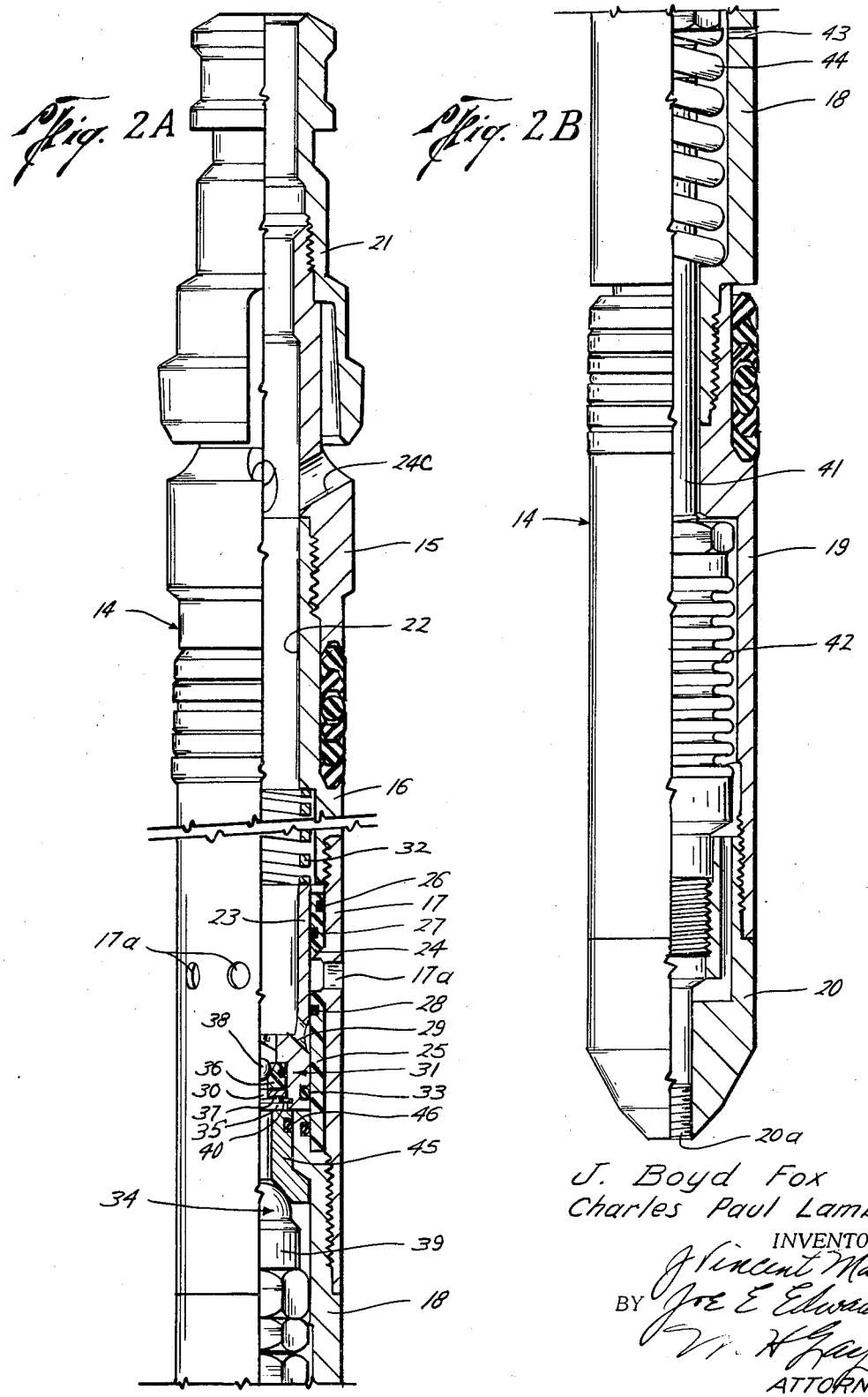
FIGURES 2A and 2B are views partially in elevation and partially in quarter-section with FIGURE 2B being a continuation of FIGURE 2A.

Referring first to FIGURE 1, the fragment of the well is taken above the producing formation and below the surface. The fragment illustrates the casing 10 having a tubing 11 therein. This tubing may be provided with any conventional means for mounting gas lift valves such as the side pockets 12 in which the valves 13 constructed in accordance with this invention are mounted.

Referring now to FIGURES 2A and 2B, the valve member includes a body indicated generally at 14. This body includes the latch adapter 15, the upper packing adapter 16, the inlet thimble 17, the spring housing 18, the bellows housing 19 and the bottom cap 20 having a plug 20a therein.

Fitted to the latch adapter 15 on top of the valve is a latch 21. While this latch is not necessary, it is desirable in the case of malfunction of the valve and to assure the well owner that under no circumstances will it be possible for the valve to accidentally be dislodged from its seat.

Within the body 14 the bore 22 provides a flowway which communicates with the inlet ports 17a and outlet ports 24c to provide a flowway through the valve.

Controlling flow through the flowway is a sleeve valve 23 and a seat provided by upper seat 24 and lower seat 25. It will be noted that the inlet passageways 17a extend through the seat and are closed off when the valve 23 is in the position shown in FIGURE 2A.

Preferably the seat is made of Teflon (Tetrafluoroethylene) assisted by the O-rings 26, 27 and 28 for insuring fluid-tight seals. Teflon is preferred as the seating material because it will imbed any abrasive particles which tend to deposit on the seat or valve member, and thus the valve system is not subject to dirt and scale buildup which is common on metal cylinders. Also, the Teflon sleeves give a very low breakout friction.

The valve member 23 is an annular sleeve having a sliding seal with the Teflon seats and the O-rings 27 and 28. The sleeve has a plurality of ports 29 extending therethrough which, when the valve member is in open position as illustrated in FIGURE 3, are in register with the inlet ports 17a to permit gas flow through the valve.

As the sleeve 23 is of a constant diameter, casing pressure present at inlet ports 29 has no effect on opening or closing movement of the valve member. Tubing pressure has no effect on the valve member and the differential across the motor indicated generally at 31 controls the valve member.

In view of the pressure balance situation, a resilient means such as the valve spring 32 is provided for urging the sleeve valve 23 toward closed position. It will also be noted that this return spring serves two additional purposes. The first purpose is that it acts as a bumper to absorb the energy of the opening force as the valve member is opened. Also, it stacks to a solid height to position the ports 29 in the sleeve valve member in register with ports 17a as illustrated in FIGURE 3.

A pressure-responsive member is provided for controlling opening and closing of the sleeve valve member 23. Preferably, the pressure-responsive member is provided by the piston indicated generally at 31 which has a sliding seal with the lower seat 25. An O-ring 33 in the piston insures a fluid-tight seal with the seat.

With the pilot valve indicated generally at 34 in seated position, as shown in FIGURE 2A, tubing pressure will be present on both sides of the piston 31, and the spring 32 will maintain the sleeve valve in closed position. When the pilot valve opens, casing pressure will be present below the piston and the differential in pressure will force the valve member 23 against the force of the spring 32 to full open position. It might be noted that, while the piston and sleeve valve are shown as a single integral structure, they could be fabricated in any desired manner such as, for instance, from two separate pieces suitably secured together.

In order that the opening and closing of the pilot valve will change the pressure conditions across the piston 31, some means is provided for permitting tubing pressure to be effective on both sides of the piston 31 when the pilot valve is closed, and casing pressure to be effective on the underside of the piston when the pilot valve is open. In the illustrated form of the invention, this means is provided by a bleed port 30 extending through the piston. This port provides a differential across the piston when the pilot valve is open, and when the pilot valve is closed permits the pressure within chamber 35 to bleed off to tubing pressure and permit the spring 32 to close the sleeve valve.

In the event there is a pressure reversal, that is, tubing pressure is greater than casing pressure when the main valve is open, as shown in FIGURE 3, it is desirable that the full force of this reversal of pressure be immediately effective on the piston 31 to move it downwardly and prevent backflow through the ports 29 and 17a. For this purpose, a check valve is preferably provided in the piston 31 controlling flow through the bleed passageway 30. In the illustrated embodiment, the piston 31 has positioned therein a Teflon seat 36 held in place by retainer 37 and snap ring 40. The bleed 30 extends through the retainer 37 and the seat 36. A ball valve member 38 is cooperable with the seat 36 to close off the bleed port and cause the piston to return to closed position under a pressure reversal.

It might be noted that it is not the purpose of ball check 38 to maintain a perfect seal, though this type check valve usually is quite efficient when fluids are present on the ball and seat. However, should a slight leak occur, it would not be great enough to cause the valve to malfunction and hang open.

Should the valve be in the open position, it would still return the sleeve valve 23 to its closed position, shutting off ports 29, thus preventing the reverse flow of well fluids into the casing.

Referring now to the pilot valve 34 (FIGS. 2A and 2B), the valve member 39 is carried by the valve stem 41 which is connected to the conventional bellows 42. The bellows 42 is exposed to casing pressure through ports 43 so that the opening and closing movement of the pilot valve will be responsive to casing pressure present on the bellows and to tubing pressure on the end of the valve member 39. The pilot spring 44 urges the pilot valve toward closed position.

The pilot valve member 39 cooperates with seat 45 to control flow through the pilot valve.

The pilot valve seat 45 also functions as a safety check valve to prevent reverse flow through the pilot valve. The seat 45 has a sliding seal with spring housing 18, and an O-ring 46 is provided to prevent flow of fluid through this sliding relationship. With this arrangement, if the pressure in chamber 35 (FIG. 4) above the valve seat becomes greater than casing pressure, the valve seat will move downwardly and will remain in contact with pilot valve 34 to prevent reverse flow through the pilot valve. As shown in FIG. 4, gravity may cause the seat 45 to move down and contact the pilot valve member 34 even in the absence of failure of the ball valve 38 and seat.

In operation, the valve when installed in the well will have its parts in the position shown in FIGURES 2A and 2B. As the differential of casing pressure over tubing pressure reaches a selected value, the pilot valve 34 will open and casing pressure will be effective on the bottom side of the piston 31. As the effective areas of the combination piston and valve member are equal on opposite sides, the force of the greater pressure will move the sleeve valve 23 to open position as shown in FIGURE 3. In moving to the open position, the spring 32 will absorb the opening force and will stack in solid height as shown in FIGURE 3 to limit opening movement of the valve. During normal operation, casing gas will flow through ports 17a and ports 29 in sleeve 23, up through the wide-open bore 22 and out ports 24c and the open end of the bore 22 at the top of the valve. The reactive force of this fluid will be in a downward direction, and this will tend to seat the valve in the side pocket mandrel 12 (FIG. 1). Upon casing pressure reducing to a selected value, the pilot valve 34 will close and the pressure in chamber 35 will escape through the bleed port 30 and reduce to tubing pressure. Upon this event, the pressure on opposite sides of the valve member and piston is equal and the spring 32 will return the valve member to closed position as shown in FIGURE 2A. The arrangement of spring 32 and the pressure surfaces across the piston permit the sleeve valve to move smoothly to open and closed position.

If a sudden reversal of pressure conditions occurs with the valve member in open position, this reversal of pressure causes valve 38 to land on seat 36 (FIG. 4), and the superior tubing pressure moves the piston 31 downwardly to seat the sleeve valve 23 in closed position.

Since the valve was in the open position, meaning casing pressure was great enough to pull the pilot valve 34 off its seat 45, then casing pressure having not been reduced sufficiently to close pilot valve 34 will continue to hold said valve off its seat 45.

If check valve 38 should leak, it is conceivable that said leak would transfer into the casing. However, this leak would be so slight that it would normally not be noticed.

Once the tubing pressure became such that casing pressure had a controlling differential to once again snap the sleeve valve to the open position as shown in FIGURE 3, then the valve would operate as designed and close off as it is supposed to under normal conditions.

In the event of total failure of the check valve 38, then the secondary check valve provided by seat 45 would prevent reverse flow through the pilot valve.

In some instances it is desirable to have a valve in which a relatively low differential is required to operate the valve. Such a valve is shown in FIGURE 5. In this form of valve, the inlet ports 17b and ports 29a through the sleeve valve are slanted so that incoming fluid is directed against the face of piston 31a. This incoming fluid must reverse directions to flow up through bore 22, and thus a buildup of pressure will occur at the surface of the piston 31a. The pressure at this point will be less than casing but greater than tubing. This increase in pressure will assist the spring 32 in closing the main valve 23a. As this assist in closing is present, the spring 32 may exert lesser force, and thus the differential across the piston 31a will be less than in the form of valve shown in FIGURE 2A.

To insure that the pressure within chamber 35 will reduce to tubing pressure upon closing of the pilot valve 34, the pressure from chamber 35 is dumped into the bore at a point downstream from the built up pressure area. Preferably, this is accomplished by a tube 47 which is carried in the piston 31a and extends therethrough. The outlet, or upper end, of tube 47 terminates at a point above the area of built up pressure so that pressure in chamber 35 can pass through tube 47 to an area where tubing pressure is present to insure closing of the main valve upon closing of the pilot valve 34. It will be noted that the tube 47 provides the bleed passageway through the piston so that, when the pilot valve is open, casing pressure will be present in chamber 35. The lower end 47a of the tube cooperates with the upwardly facing surface 48 of spring housing 18a. This provides some check valve action against a reversal of pressure conditions, but the main check action to prevent reverse flow through the pilot valve is the floating seat as hereinabove explained.

If desired, the valve member 23a may be made in two parts which have a press fit with each other as shown at 23b. Also, the body may include a stop 49 which cooperates with main valve to limit opening movement of the main valve.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A gas lift valve comprising,
a tubular body having a bore therein,
an inlet in the side wall of the body in communication with the bore and an outlet in communication with the bore to provide a flowway through the valve,
a cylindrical surface in said bore perforated by said inlet and providing a valve seat,
a ported sleeve valve member having a sliding seal with said cylindrical surface controlling flow through said passageway,
resilient means urging said valve member toward seated position,
a pressure-responsive member in said bore connected to said sleeve valve member and exposed on one side to outlet pressure,
means including a pressure-responsive pilot valve for selectively exposing the other side of said pressure-responsive member to inlet or outlet pressure,
and means for preventing reverse flow through said pilot valve.

2. The valve of claim 1 wherein said resilient means provides a stop limiting opening movement of the valve member.

3. The valve of claim 1 wherein one of said valve seat and said valve member is tetrafluoroethylene.

4. The gas lift valve of claim 1 wherein the pressure-responsive pilot valve includes a pilot valve seat having a sliding seal with the body and movable with the pilot valve member to prevent reverse flow through the pilot valve under reverse flow pressure conditions.

5. A gas lift valve comprising,
a tubular body having a bore therein,
an inlet in the side wall of the body in communication with the bore and an outlet in communication with the bore to provide a flowway through the valve,
a cylindrical surface in said bore perforated by said inlet and providing a valve seat,
a ported sleeve valve member having a sliding seal with said cylindrical surface controlling flow through said passageway,
said cylindrical surface having a constant diameter whereby neither inlet nor outlet pressure is effective on the valve member,
resilient means urging said valve member toward seated position,
a pressure-responsive member in said bore connected to said sleeve valve member and exposed on one side to outlet pressure,
said pressure-responsive member providing the sole opening force for the valve member and said resilient means providing the sole closing force for the valve member,
means including a pressure-responsive pilot valve for selectively exposing the other side of said pressure-responsive member to inlet or outlet pressure,
and means for preventing reverse flow through said pilot valve.

6. A gas lift valve comprising,
a tubular body having a bore therein,
an inlet in the side wall of the body in communication with the bore and an outlet in communication with the bore to provide a flowway through the valve,
a cylindrical surface in said bore perforated by said inlet and providing a valve seat,
a ported sleeve valve member having a sliding seal with said cylindrical surface controlling flow through said passageway,
resilient means urging said valve member toward seated position,
a pressure-responsive member in said bore connected to said sleeve valve member and exposed on one side to outlet pressure,
said inlet extending through said body in a direction to direct fluid against said pressure-responsive member when the sleeve valve member is in open position,
a tube extending through said pressure-responsive member to a point downstream at which the pressure is less than inlet pressure,
means including a pressure-responsive pilot valve for selectively exposing the other side of said pressure-responsive member to inlet or outlet pressure,
and means for preventing reverse flow through said pilot valve.

7. The gas lift valve of claim 6 wherein means are cooperable with said tube to provide a check valve limiting reverse flow through said pressure-responsive member under reverse flow conditions.

References Cited

UNITED STATES PATENTS

| | | | |
|---|---|---|---|
| 2,037,179 | 4/1936 | Robart | 137—489.5 |
| 2,408,708 | 10/1946 | Tweedle | 137—489.5 |
| 3,101,735 | 8/1963 | Brown | 137—155 |
| 3,105,509 | 10/1963 | Moore | 137—489.5 X |
| 3,183,922 | 5/1965 | Lamb | 137—489.5 X |
| 3,294,113 | 12/1966 | Chenoweth | 137—508 |
| 3,315,747 | 4/1967 | Farley | 251—282 X |

ALAN COHAN, Primary Examiner

U.S. Cl. X.R.

103—232